(12) United States Patent
Takemori et al.

(10) Patent No.: US 7,345,119 B2
(45) Date of Patent: Mar. 18, 2008

(54) OLEFIN POLYMERIZATION CATALYST AND OLEFIN POLYMERIZATION METHOD USING THE SAME

(75) Inventors: Toshifumi Takemori, Chiba (JP); Minoru Iijima, Chiba (JP); Yoshihisa Hayashida, Chiba (JP); Masashi Iida, Chiba (JP)

(73) Assignee: Maruzen Petrochemical Company, Limited, Tokyo (JP)

( * ) Notice: Subject to any disclaimer, the term of this patent is extended or adjusted under 35 U.S.C. 154(b) by 224 days.

(21) Appl. No.: 10/998,837

(22) Filed: Nov. 30, 2004

(65) Prior Publication Data

US 2005/0215736 A1    Sep. 29, 2005

(30) Foreign Application Priority Data

Dec. 1, 2003    (JP)    ............... 2003-402182

(51) Int. Cl.
*C08F 4/02*     (2006.01)
*C08F 4/6392*   (2006.01)
*C08F 110/02*   (2006.01)
*C08F 4/64*     (2006.01)

(52) U.S. Cl. ............. 526/165; 526/160; 526/129; 526/352; 502/103; 502/120; 502/152

(58) Field of Classification Search .......... 502/103, 502/120, 152; 526/160, 165, 352, 129
See application file for complete search history.

(56) References Cited

U.S. PATENT DOCUMENTS

| | | | |
|---|---|---|---|
| 5,789,502 A | 8/1998 | Shamshoum et al. |
| 6,787,616 B2 | 9/2004 | Takemori et al. |
| 2003/0203807 A1 | 10/2003 | Wang et al. |

FOREIGN PATENT DOCUMENTS

| | | |
|---|---|---|
| EP | 0 997 480 A1 | 5/2000 |
| EP | 1 380 598 A1 | 1/2004 |
| JP | 58-19309 | 2/1983 |
| JP | 60-35007 | 2/1985 |
| JP | 61-108610 | 5/1986 |
| JP | 61-296008 | 12/1986 |
| JP | 68-280703 | 11/1988 |
| JP | 05-140225 | 6/1993 |
| JP | 05-331227 | 12/1993 |
| JP | 06-100614 | 4/1994 |
| JP | 7-508065 | 9/1995 |
| JP | 3244124 | 10/2001 |
| WO | WO 01/32721 A1 | 5/2001 |

*Primary Examiner*—Caixia Lu
(74) *Attorney, Agent, or Firm*—Oblon, Spivak, McClelland, Maier & Neustadt, P.C.

(57) ABSTRACT

An olefin polymerization solid catalyst including a reaction product of a transition metal compound and an organoaluminum compound carried on a support having silica treated with an organoaluminum-oxy compound.

8 Claims, No Drawings

OLEFIN POLYMERIZATION CATALYST AND OLEFIN POLYMERIZATION METHOD USING THE SAME

The present invention relates to an olefin polymerization solid catalyst and an olefinic polymer production method using the solid catalyst. Particularly, the present invention relates to an olefin polymerization solid catalyst for efficiently producing an olefin polymer having a high bulk density, excellent powder properties and a narrow molecular weight distribution, which requires no deashing treatment due to a high polymerization activity, and is stable to air, water and the like and not corrosive to a metal, and also relates to an olefinic polymer production method which comprises polymerizing or copolymerizing an olefin by using the above solid catalyst.

Patent Publication 1 and Patent Publication 2 disclose an olefin (co)polymerization catalyst system comprising an organoaluminum-oxy compound and a zirconocene compound containing a IVB Group transition metal of the Periodic Table, and a method for producing an ethylene (co)polymer by using the above catalyst system, and the above catalyst system is known to provide a high olefin polymerization activity in solution polymerization system.

Also, there are known various catalysts having at least one component of a metallocene compound and an aluminoxane supported on a porous inorganic oxide support such as silica, alumina, silica-alumina or the like, and various olefin (co)polymerization methods in slurry polymerization system or gas phase polymerization system using these catalysts. For example, Patent Publication 3 and Patent Publication 4 disclose a method for polymerizing an olefin in the presence of a metallocene-carrying type catalyst having a metallocene compound and an aluminoxane supported on a support such as an inorganic oxide. Also, Patent Publication 5 discloses a method for previously activating a catalyst by prepolymerizing an olefin in the presence of a zirconocene compound, an aluminoxane, an organoaluminum compound and a silica support.

However, when polymerization or copolymerization of an olefin is carried out by using these conventional solid catalyst components in slurry polymerization system or gas phase polymerization system, a polymerization activity is remarkably lowered as compared with the above solution polymerization system, and a polymer having a satisfactory bulk density can not be obtained.

In order to solve these problems, there is proposed a method of supporting a reaction product obtained by previously contacting a metallocene compound with an organoaluminum compound or an aluminoxane on a solid-like support. For example, Patent Publication 6 discloses a method for polymerizing an olefin in the presence of a catalyst characterized by reacting a metallocene compound and an aluminoxane in a solvent and then carrying the reaction product on silica.

Also, Patent Publication 7 discloses a method for gas phase polymerization of an olefin in the presence of hydrogen under a hydrogen partial pressure of from 0.01 to 10% by using a catalyst having a reaction product of a specific metallocene compound and an organic metal compound supported on a fine particulate support previously treated with an aluminoxane. However, these prior art catalysts are improved in respects of powder properties or deposit to a polymerization reactor, but are unsatisfactory in respect of a catalyst activity, particularly a polymerization activity per solid catalyst, and these conventional methods are limited to such a specific polymerization system as a gas phase polymerization system in the presence of hydrogen.

On the other hand, a metallocene compound used as a catalyst component in the above prior art has an alkadienyl group such as a cyclopentadienyl group as a ligand to a transition metal, and a metallocene compound having an alkyl group or a halogen atom such as a chlorine atom is known to be useful. In these metallocene compounds, a compound having a chlorine atom directly bonded to a transition metal atom has a high polymerization activity, but depending on a kind of olefins or a polymerization method, a treatment with an alcohol or water is required after polymerization, and consequently there is a defect of forming hydrogen chloride causing rust or corrosion on apparatuses.

Further, olefin polymers or copolymers produced by using a solid catalyst comprising a metallocene compound having a chlorine atom directly bonded to a transition metal atom as a catalyst component, finally contains the solid catalyst remained therein. In such a case, the bonding between the transition metal atom and the chlorine atom in the polymers is easily decomposed by heat or easily hydrolyzed, and therefore the remaining chlorine compound causes such a bad influence as yellow coloring to the final product at a post step requiring heating or during storing. Therefore, it has been demanded to develop a solid catalyst containing substantially no free halogen atoms having a bad influence on a final product but having a high activity, and such a solid catalyst as having substantially no catalyst residue remained in a polymer and having substantially no risk of causing yellow coloring to a product at a post step such as heating.

In order to solve the above-mentioned problems caused by using the above-mentioned metallocene compounds, the present applicant has proposed in Patent Publication 8 an olefinic solid catalyst comprising an organoaluminum-oxy compound and a metallocene compound containing aryloxy ligands having a specific substituent introduced on a benzene ring of a phenoxide, which has no alkyl bonding with a transition metal and contains no halogen directly bonded to a transition metal, and an olefin polymerization method using this catalyst. However, according to this method, the above-mentioned problems are solved, but a catalyst activity, particularly a polymerization activity per solid catalyst, is still unsatisfactory and is required to be improved.

Patent Publication 1 JP-A-58-019309
Patent Publication 2 JP-A-60-035007
Patent Publication 3 JP-A-61-108610
Patent Publication 4 JP-A-61-296008
Patent Publication 5 JP-A-63-280703
Patent Publication 6 JP-A-07-508065
Patent Publication 7 JP-A-05-331227
Patent Publication 8 WO99/02571

An object of the present invention is to solve the above-mentioned prior art problems and to provide an olefin polymerization solid catalyst for efficiently producing an olefin polymer having a narrow molecular weight distribution and having excellent powder properties of a narrow particle size distribution and a high bulk density, which has a high polymerization activity and is stable to air and water and not corrosive to a metal, and also to provide a method for producing an olefinic polymer by using such a satisfactory catalyst.

The present inventors have intensively studied and found that the above object can be achieved by using a novel olefin polymerization solid catalyst selectively employing (C) a specific transition metal compound of the following formula (1) or (2) as a catalyst component and having a reaction product (C) of the transition metal compound and (D) an organoaluminum compound carried on a support of (A) silica treated with (B) an organoaluminum-oxy compound.

Thus, unlike the prior art, the present inventors have found that an olefinic polymer having a narrow molecular weight distribution and having excellent powder properties of a high bulk density and a narrow particle size distribution can be produced even by slurry polymerization or gas phase polymerization by using a novel solid catalyst having an excellent polymerization activity per solid catalyst, which does not necessarily require the presence of hydrogen and is stable to air and water and is not corrosive to a metal.

That is, the present invention has the following features.
(1) An olefin polymerization solid catalyst which comprises having a reaction product of (C) a transition metal compound of the following formula (1) or (2) and (D) an organoaluminum compound carried on a support having (A) silica treated with (B) an organoaluminum-oxy compound;

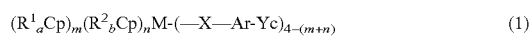

$$(R^1{}_aCp)_m(R^2{}_bCp)_n M\text{-}(\text{---}X\text{---}Ar\text{-}Yc)_{4-(m+n)} \qquad (1)$$

wherein M is titanium, zirconium or hafnium, Cp is a group having a cyclopentadienyl structure, $R^1$ and $R^2$ are a hydrogen atom, an alkyl group, an alkenyl group, an aryl group, an alkylaryl group, an arylalkyl group or an alkylsilyl group, X is an oxygen atom or a sulfur atom, Ar is an aromatic ring, Y may be the same or different and is a hydrogen atom or a substituent selected from the group consisting of a hydrocarbon group, an alkylsilyl group, a halogen atom, a halogenated hydrocarbon group, a nitrogen-containing organic group, an oxygen-containing organic group or a sulfur-containing organic group, a and b are an integer of from 0 to 5, m and n are an integer of from 0 to 3, m+n is an integer of from 1 to 3, and c is an integer of from 1 to 5, provided that Y is not hydrogen when Ar is a benzene ring,

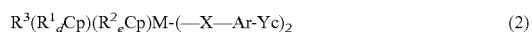

$$R^3(R^1{}_dCp)(R^2{}_eCp)M\text{-}(\text{---}X\text{---}Ar\text{-}Yc)_2 \qquad (2)$$

wherein M is titanium, zirconium or hafnium, Cp is a group having a cyclopentadienyl structure, $R^1$ and $R^2$ are a hydrogen atom, an alkyl group, an alkenyl group, an aryl group, an alkylaryl group, an arylalkyl group or an alkylsilyl group, $R^3$ is a divalent group selected from the group consisting of an alkylene group, an arylalkylene group, a dialkylsilylene group, a dialkylgermylene group, an alkylphosphinediyl group or an alkylimino group, which crosslinkes $(R^1{}_dCp)$ and $(R^2{}_eCp)$, X is an oxygen atom or a sulfur atom, Ar is an aromatic ring, Y may be the same or different and is a hydrogen atom or a substituent selected from the group consisting of a hydrocarbon group, an alkylsilyl group, a halogen atom, a halogenated hydrocarbon group, a nitrogen-containing organic group, an oxygen-containing organic group and a sulfur-containing organic group, d and e are an integer of from 0 to 4, and c is an integer of from 1 to 5, provided that Y is not hydrogen when Ar is a benzene ring.
(2) A method for producing an olefinic polymer, characterized by polymerizing or copolymerizing an olefin in the presence of the above olefin polymerization solid catalyst.

Unlike the prior art, the olefin polymerization solid catalyst of the present invention is excellent in polymerization activity per solid catalyst even in slurry polymerization and gas phase polymerization and does not require the presence of hydrogen, and is stable to air and water and not corrosive to a metal, and can efficiently produce an olefin polymer having a narrow molecular weight distribution and having excellent powder properties of containing less large particles or fine particles and having a narrow particle size distribution and a high bulk density.

Hereinafter, the olefin polymerization solid catalyst of the present invention and the olefin polymerization method using this catalyst are more fully described below.

In the present invention, the term "polymerization" includes not only "homopolymerization" but also "copolymerization", and the term "polymer" includes not only "homopolymer" but also "copolymer".

The silica support (A) (hereinafter referred to as "component (A)") used in the preparation of the olefin polymerization solid catalyst of the present invention includes silica alone or a mixture containing silica such as $SiO_2$—MgO, $SiO_2$—$Al_2O_3$, $SiO_2$—$TiO_2$, $SiO_2$—$V_2O_5$, $SiO_2$—$Cr_2O_2$, $SiO_2$—$TiO_2$—MgO or the like. These supports may be adsorbed with a small amount of water content or may contain a small amount of impurities. However, it is preferred to be calcinated at a temperature of from 100 to 1,000° C., preferably from 150 to 700° C., in a stream of dry gas such as air or nitrogen.

In the present invention, it is preferred that the above silica support (A) satisfies respective properties of the following specific average particle size, specific surface area and pore volume. That is, it is preferred that the silica support has an average particle size of from 2 to 20 μm, preferably from 4 to 10 μm. If the average particle size is smaller than 2 μm, a settling speed of catalyst particles at the time of preparing a solid catalyst is slow, and consequently there are caused various problems that a productivity of the solid catalyst becomes poor, particles tend to be agglomerated, morphology of the catalyst becomes poor, and amounts of fine particles and large particles contained in a polymer formed are unpreferably increased. Also, when the average particle size exceeds 20 μm, a particle size of a polymer formed extremely enlarged and consequently there are caused various problems that bulk density and fluidity are lowered, pipes and conduits are clogged at the time of production, and fish eyes are unpreferably increased particularly when a polymer is used for a film.

It is preferred that the silica support has a specific surface area of from 350 to 850 $m^2/g$, preferably from 650 to 800 $m^2/g$. If the specific surface area is smaller than 350 $m^2/g$, a free organoaluminum compound in an aluminoxane is easily reacted with a hydroxyl group on the surface of the support and consequently a catalyst component to be carried is not fully carried on the support. If the specific surface area is larger than 850 $m^2/g$, an amount of the surface hydroxyl group becomes too large, and consequently a side reaction easily occurs when a catalyst component is carried, and an amount of unreacted hydroxyl groups becomes too large, which lowers the catalyst activity unpreferably.

Further, it is preferred that the silica support has a pore volume of from 0.1 to 0.8 ml/g, preferably from 0.15 to 0.4 ml/g. If the pore volume is smaller than 0.1 ml/g, it is difficult to satisfactorily carry the catalyst component, and if the pore volume is larger than 0.8 ml/g, the catalyst component is unevenly distributed in pores and a satisfactory catalyst activity can not be achieved. Also, adhesion of a polymer to a polymerization reactor occurs and bulk density of a polymer formed is lowered.

(B) An organoaluminum-oxy compound used in the present invention (hereinafter referred to as "component (B)") is preferably a linear alkylaluminoxane of the following formula (3) or a cyclic aluminoxane of the following formula (4).

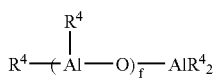
(3)

(In the above formula, $R^4$ is a hydrogen atom or a $C_1$-$C_{10}$ alkyl group, and f is an integer of from 2 to 40.)

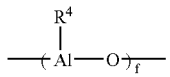
(4)

(In the above formula, the definitions $R^4$ and f are the same as defined with regard to the above formula (3).)

In the above formulae (3) and (4), when $R^4$ is a $C_1$-$C_{10}$ alkyl group, its examples include a methyl group, an ethyl group, an isobutyl group and the like. Also, the compounds of the formulae (3) and (4) may have different $R^4$ groups in a compound. Also, the number f of repeating units is selected from the range of from 2 to 40, preferably from the range of from 5 to 30. In the compounds of the formulae (3) and (4), it is preferred that $R^4$ is a methyl group alone or a methyl group and other group.

The organoaluminum-oxy compound (B) of the formula (3) or (4) may be a known aluminoxane, and can be produced by the following methods (1) to (3).

(1) A method which comprises adding an organoaluminum compound such as a trialkylaluminum to a suspension of compounds containing adsorption water or salts containing crystal water, such as magnesium chloride hydrate, copper sulfate hydrate, aluminum sulfate hydrate, nickel sulfate hydrate, cerous chloride hydrate or the like in a hydrocarbon medium to react them and recovering the reaction product as a hydrocarbon solution.

(2) A method which comprises applying water, ice or water vapor directly to an organoaluminum compound such as a trialkylaluminum in a solvent such as benzene, toluene, ethyl ether, tetrahydrofuran or the like and recovering the material thus treated as a hydrocarbon solution.

(3) A method which comprises reacting an organic tin compound such as dimethyltin oxide, dibutyltin oxide or the like with an organoaluminum compound such as a trialkylaluminum in a medium such as decane, benzene, toluene or the like.

Examples of the solvent used in the production of an aluminoxane include an aromatic hydrocarbon such as benzene, toluene, xylene, cumene or cymene, an aliphatic hydrocarbon such as pentane, hexane, heptane, octane, decane, dodecane, hexadecane or octadecane, a cycloaliphatic hydrocarbon such as cyclopentane, cyclohexane, cyclooctane or methylcyclopentane, a petroleum distillate such as gasoline, kerosine or gas oil, or a halide such as chloride or bromide of the above aromatic hydrocarbon, aliphatic hydrocarbon or alicyclic hydrocarbon solvent. In addition, ethers such as ethyl ether or tetrahydrofuran may be used. Among these solvents, an aromatic hydrocarbon is particularly preferable.

The above aluminoxane may contain an unreacted organoaluminum compound, or the solvent or the unreacted organoaluminum compound may be removed from the above aluminoxane solution by distillation and may be redissolved in a solvent. Also, the above aluminoxanes may have a small amount of an alkylaluminum compound incorporated.

Usually, an easily commercially available methylaluminoxane contains trimethylaluminum in an amount of from 14 to 30 mol % in terms of Al atom, and can be satisfactorily used in the present invention without making any pretreatment.

A content of trimethylaluminum (hereinafter referred to as "TMAL") in methylaluminoxane is calculated from an area of a sharp peak attributable to hydrogen of trimethylaluminum observed in the vicinity of −0.4 ppm and an area of a wide peak attributable to hydrogen of methylaluminoxane observed at 0.45 to −0.4 ppm in $^1$H NMR spectrum measured in a mixture solvent of deuterated dioxane and deuterated benzene at room temperature.

In the olefin polymerization solid catalyst of the present invention, it is important to employ a reaction product (C) (hereinafter referred to as component (C)) of an organoaluminum and a IVB group transition metal compound containing a ligand having a cyclopentadienyl structure of the following formula (1) or (2) carried on (A) silica treated with (B) an organoaluminum-oxy compound.

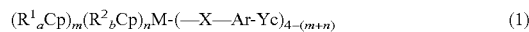
(1)

(In the above formula, the definitions of M, Cp, $R^1$, $R^2$, X, Ar, Y, a, b, m, n and c are the same as defined above.)

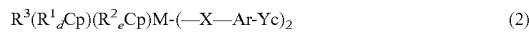
(2)

(In the above formula, the definitions of M, Cp, $R^1$, $R^2$, $R^3$, X, Ar, Y, d, e and c are the same as define above.)

In the formulae (1) and (2), a Cp group as a ligand may be any group as long as it is a group having a cyclopentadienyl structure, and includes not only a cyclopentadienyl group but also a cyclopentadienyl group forming 4-, 5- or 6-membered ring wherein adjacent two carbon atoms of a cyclopentadienyl ring bond with other carbon atoms. Examples of the cyclopentadienyl group forming 4-, 5- or 6-membered ring wherein adjacent two carbon atoms of the cyclopentadienyl ring bond with other carbon atoms, include an indenyl group, a tetrahydroindenyl group, a fluorenyl group or the like.

Also, in the formulae (1) and (2), when $R^1$ and $R^2$ are not a hydrogen atom, preferable examples of $R^1$ and $R^2$ include a $C_1$-$C_{20}$ alkyl group, a $C_2$-$C_{20}$ alkenyl group, a $C_6$-$C_{20}$ aryl group, a $C_7$-$C_{20}$ alkylaryl group, $C_7$-$C_{20}$ arylalkyl group or a $C_3$-$C_{20}$ alkylsilyl group.

In the formula (1), examples of $R^1{}_a$Cp and $R^2{}_b$Cp groups respectively having a cyclopentadienyl structure, include a cyclopentadienyl group, a methylcyclopentadienyl group, an ethylcyclopentadienyl group, a n-propylcyclopentadienyl group, an isopropylcyclopentadienyl group, a n-butylcyclopentadienyl group, an isobutylcyclopentadienyl group, a tertiary-butylcyclopentadienyl group, a 1,2-dimethylcyclopentadienyl group, a 1,3-dimethylcyclopentadienyl group, a 1,2,4-trimethylcyclopentadienyl group, a 1,2,3-trimethylcyclopentadienyl group, a tetramethylcyclopentadienyl group, a pentamethylcyclopentadienyl group, a trimethylsilylcyclopentadienyl group, a trimethylsilyltetramethylcyclopentadienyl group, a (phenyldimethylsilyl)cyclopentadienyl group, a triphenylsilylcyclopentadienyl group, a 1,3-bis(trimethylsilyl)cyclopentadienyl group, a cyclohexylcyclopentadienyl group, an arylcyclopentadienyl group, a benzylcyclopentadienyl group, a phenylcyclopentadienyl group, a tolylcyclopentadienyl group, an indenyl group, a 1-methylindenyl group, a 2-methylindenyl group, a 2,4-dimethylindenyl group, a 4,7-dimethoxyindenyl group, a 4,7-dichloroindenyl group, a 5,6-dimethylindenyl group, a 2-methyl-4-ethyl-indenyl group, a 2-methyl-4,6-diisopropyl-indenyl group, a naphthylindenyl group, a 4,5,6,7-tetrahydroindenyl group, a 2-methyl-tetrahydroindenyl group, a fluorenyl group, a 2,7-ditertiary-butylfluorenyl group, and the like.

Also, in the formula (2), $R^3$ is a $C_1$-$C_{20}$ divalent group crosslinking $(R^1_dCp)$ and $(R^2_eCp)$, examples of which include an alkylene group such as a methylene group or an ethylene group; an alkylidene group such as an ethylidene group, a propylidene group or an isopropylidene group; an arylalkylidene group such as a phenylmethylidene group or a diphenylmethylidene group; a silylene group such as a dimethylsilylene group, a diethylsilylene group, a dipropylsilylene group, a diisopropylsilylene group, a methylethylsilylene group, a methylisopropylsilylene group, a methyl tertiary-butylsilylene group, a methylphenylsilylene group or a diphenylsilylene group; a germylene group such as a dimethylgermylene group, a diethylgermylene group, a dipropylgermylene group, a diisopropylgermylene group, a diphenylgermylene group, a methylethylgermylene group, a methylisopropylgermylene group, a methyl tertiary-butylgermylene group, a methylphenylgermylene group or a diphenylgermylene group; an alkylphosphinediyl group such as a methylphosphinediyl group; an alkylimino group such as a methylimino group; an alkylboranediyl group such as a methylboranediyl group; and the like.

Further, in the formula (2), examples of a $R^3(R^1_dCp)$ $(R^2_eCp)$ group having a cyclopentadienyl structure include an ethylene bisindenyl group, a diphenylmethylene bisindenyl group, a dimethylsilylene bisindenyl group, an isopropylidene bisindenyl group, a dimethylsilylene bistetrahydroindenyl group, an isopropylidene cyclopentadienyl-1-fluorenyl group, a diphenylmethylene cyclopentadienyl-1-fluorenyl group, a dimethylsilylene cyclopentadienyl-1-fluorenyl group, a dimethylsilylenebis(2,3,5-trimethylcyclopentadienyl) group, a dimethylsilylenebis(2,4-dimethylcyclopentadienyl) group, a dimethylsilylenebis(3-methylcyclopentadienyl) group, an isopropylidene cyclopentadienyl-methylcyclopentadienyl group, an isopropylidene cyclopentadienyl-2,3,5-trimethylcyclopentadienyl group, a diphenylmethylene cyclopentadienyl-methylcyclopentadienyl group, a diphenylmethylene cyclopentadienyl-2,4-dimethylcyclopentadienyl group, a diphenylmethylene cyclopentadienyl-2,3,5-trimethylcyclopentadienyl group, a dimethylsilylene cyclopentadienyl-methylcyclopentadienyl group, a dimethylsilylene cyclopentadienyl-2,4-dimethylcyclopentadienyl group, a dimethylsilylene cyclopentadienyl-2,3,5-trimethylcyclopentadienyl group, an isopropylidene-2,4-dimethylcyclopentadienyl-1-fluorenyl group, a diphenylmethylene-2,4-dimethylcyclopentadienyl-1-fluorenyl group, a dimethylsilylene-2,4-dimethylcyclopentadienyl-1-fluorenyl group, a cyclohexylidene cyclopentadienyl-1-fluorenyl group, a dimethylgermylenebis-1-indenyl group, and the like.

Examples of metallocene compounds having various aryloxy groups or substituted aryloxy groups as defined in the formula (1) are illustrated below. Dicyclopentadienylbis(2-fluorophenoxy)zirconium, dicyclopentadienylbis(3-fluorophenoxy)zirconium, dicyclopentadienylbis(4-fluorophenoxy)zirconium, dicyclopentadienylbis(2-chlorophenoxy)zirconium, dicyclopentadienylbis(3-chlorophenoxy)zirconium, dicyclopentadienylbis(4-chlorophenoxy)zirconium, dicyclopentadienylbis(2-bromophenoxy)zirconium, dicyclopentadienylbis(3-bromophenoxy)zirconium, dicyclopentadienylbis(4-bromophenoxy)zirconium, dicyclopentadienylbis(2-iodophenoxy)zirconium, dicyclopentadienylbis(3-iodophenoxy)zirconium, dicyclopentadienylbis(4-iodophenoxy)zirconium, dicyclopentadienylbis(2,3-difluorophenoxy)zirconium, dicyclopentadienylbis(2,4-difluorophenoxy)zirconium, dicyclopentadienylbis(2,5-difluorophenoxy)zirconium, dicyclopentadienylbis(2,6-difluorophenoxy)zirconium, dicyclopentadienylbis(3,4-difluorophenoxy)zirconium, dicyclopentadienylbis(3,5-difluorophenoxy)zirconium, dicyclopentadienylbis(2,3-dichlorophenoxy)zirconium, dicyclopentadienylbis(2,4-dichlorophenoxy)zirconium, dicyclopentadienylbis(2,5-dichlorophenoxy)zirconium, dicyclopentadienylbis(2,6-dichlorophenoxy)zirconium, dicyclopentadienylbis(3,4-dichlorophenoxy)zirconium, dicyclopentadienylbis(3,5-dichlorophenoxy)zirconium, dicyclopentadienylbis(2,3,4-trifluorophenoxy)zirconium, dicyclopentadienylbis(2,3,5-trifluorophenoxy)zirconium, dicyclopentadienylbis(2,3,6-trifluorophenoxy)zirconium, dicyclopentadienylbis(2,4,5-trifluorophenoxy)zirconium, dicyclopentadienylbis(2,4,6-trifluorophenoxy)zirconium, dicyclopentadienylbis(3,4,5-trifluorophenoxy)zirconium, dicyclopentadienylbis(2,3,5,6-tetrafluorophenoxy)zirconium, dicyclopentadienylbis(pentafluorophenoxy)zirconium, dicyclopentadienylbis(2-fluoromethylphenoxy)zirconium, dicyclopentadienylbis(3-fluoromethylphenoxy)zirconium, dicyclopentadienylbis(4-fluoromethylphenoxy)zirconium, dicyclopentadienylbis(2-chloromethylphenoxy)zirconium, dicyclopentadienylbis(3-chloromethylphenoxy)zirconium, dicyclopentadienylbis(4-chloromethylphenoxy)zirconium, dicyclopentadienylbis(2-trifluoromethylphenoxy)zirconium, dicyclopentadienylbis(3-trifluoromethylphenoxy)zirconium, dicyclopentadienylbis(4-trifluoromethylphenoxy)zirconium, dicyclopentadienylbis(3,5-bis(trifluoromethyl)phenoxy)zirconium, dicyclopentadienylbis(2-(2,2,2-trifluoroethyl)phenoxy)zirconium, dicyclopentadienylbis(3-(2,2,2-trifluoroethyl)phenoxy)zirconium, dicyclopentadienylbis(4-(2,2,2-trifluoroethyl)phenoxy)zirconium, dicyclopentadienylbis(2-trichloromethylphenoxy)zirconium, dicyclopentadienylbis(3-trichloromethylphenoxy)zirconium, dicyclopentadienylbis(4-trichloromethylphenoxy)zirconium, dicyclopentadienylbis(2-methylphenoxy)zirconium, dicyclopentadienylbis(3-methylphenoxy)zirconium, dicyclopentadienylbis(4-methylphenoxy)zirconium, dicyclopentadienylbis(2,3-dimethylphenoxy)zirconium, dicyclopentadienylbis(2,4-dimethylphenoxy)zirconium, dicyclopentadienylbis(2,5-dimethylphenoxy)zirconium, dicyclopentadienylbis(2,6-dimethylphenoxy)zirconium, dicyclopentadienylbis(3,4-dimethylphenoxy)zirconium, dicyclopentadienylbis(3,5-dimethylphenoxy)zirconium, dicyclopentadienylbis(2,3,4-trimethylphenoxy)zirconium, dicyclopentadienylbis(2,3,5-trimethylphenoxy)zirconium, dicyclopentadienylbis(2,3,6-trimethylphenoxy)zirconium, dicyclopentadienylbis(2,4,5-trimethylphenoxy)zirconium, dicyclopentadienylbis(2,4,6-trimethylphenoxy)zirconium, dicyclopentadienylbis(3,4,5-trimethylphenoxy)zirconium, dicyclopentadienylbis(pentamethylphenoxy)zirconium, dicyclopentadienylbis(2-methyl-4-fluorophenoxy)zirconium, dicyclopentadienylbis(2-chloro-4-fluorophenoxy)zirconium, dicyclopentadienylbis(2-chloro-4-trifluoromethylphenoxy)zirconium, dicyclopentadienylbis(2-fluoro-4-trifluoromethylphenoxy)zirconium, dicyclopentadienylbis(2-trifluoromethyl-4-fluorophenoxy)zirconium, dicyclopentadienylbis(2-ethylphenoxy)zirconium, dicyclopentadienylbis(3-ethylphenoxy)zirconium, dicyclopentadienylbis(4-ethylphenoxy)zirconium, dicyclopentadienylbis(2-isopropylphenoxy)

zirconium, dicyclopentadienylbis(3-isopropylphenoxy)zirconium, dicyclopentadienylbis(4-isopropylphenoxy)zirconium, dicyclopentadienylbis(2-tertiary-butylphenoxy)zirconium, dicyclopentadienylbis(3-tertiary-butylphenoxy)zirconium, dicyclopentadienylbis(4-tertiary-butylphenoxy)zirconium, dicyclopentadienylbis(3,5-di-tertiary-butylphenoxy)zirconium, dicyclopentadienylbis(2,8-dimethyl-1-naphthoxy)zirconium, dicyclopentadienylbis(1-tertiary-butyl-2-naphthoxy)zirconium, dicyclopentadienylbis(8-bromo-2-naphthoxy)zirconium, dicyclopentadienylbis(2-phenylphenoxy)zirconium, dicyclopentadienylbis(3-phenylphenoxy)zirconium, dicyclopentadienylbis(4-phenylphenoxy)zirconium, dicyclopentadienylbis(2-benzylphenoxy)zirconium, dicyclopentadienylbis(2-cyanophenoxy)zirconium, dicyclopentadienylbis(2-nitrophenoxy)zirconium, dicyclopentadienylbis(2-trifluoromethanesulfonylphenoxy)zirconium, dicyclopentadienylbis(4-fluorothiophenoxy)zirconium, dicyclopentadienylbis(2-trifluoromethylthiophenoxy)zirconium, dicyclopentadienylbis(3-trifluoromethylthiophenoxy)zirconium, bis(methylcyclopentadienyl)bis(2-chlorophenoxy)zirconium, bis(methylcyclopentadienyl)bis(2-trifluoromethylphenoxy)zirconium, bis(1,2-dimethylcyclopentadienyl)bis(2-ethylphenoxy)zirconium, bis(1,3-dimethylcyclopentadienyl)bis(2-trifluoromethylphenoxy)zirconium, bis(1,3-dimethylcyclopentadienyl)bis(3-tertiary-butylphenoxy)zirconium, bis(1,2,3-trimethylcyclopentadienyl)bis(2-fluorophenoxy)zirconium, bis(1,2,3-trimethylcyclopentadienyl)bis(3-fluorophenoxy)zirconium, bis(1,2,3-trimethylcyclopentadienyl)bis(4-fluorophenoxy)zirconium, bis(1,2,3-trimethylcyclopentadienyl)bis(2-isopropylphenoxy)zirconium, bis(1,2,4-trimethylcyclopentadienyl)bis(2-trifluoromethylphenoxy)zirconium, bis(1,2,4-trimethylcyclopentadienyl)bis(2-methylphenoxy)zirconium, bis(1,2,4-trimethylcyclopentadienyl)bis(3-methylphenoxy)zirconium, bis(1,2,4-trimethylcyclopentadienyl)bis(4-methylphenoxy)zirconium, bis(1,2,4-trimethylcyclopentadienyl)bis(2,4-dimethylphenoxy)zirconium, bis(1,2,4-trimethylcyclopentadienyl)bis(2,4-dichlorophenoxy)zirconium, bis(1,2,4-trimethylcyclopentadienyl)bis(2-tertiary-butylphenoxy)zirconium, bis(1,2,4-trimethylcyclopentadienyl)bis(3-tertiary-butylphenoxy)zirconium, bis(1,2,4-trimethylcyclopentadienyl)bis(4-tertiary-butylphenoxy)zirconium, bis(1,2,3,4-tetramethylcyclopentadienyl)bis(2-methoxyphenoxy)zirconium, bis(1,2,3,4-tetramethylcyclopentadienyl)bis(3-methoxyphenoxy)zirconium, bis(1,2,3,4-tetramethylcyclopentadienyl)bis(4-methoxyphenoxy)zirconium, bis(1,2,3,4-tetramethylcyclopentadienyl)bis(2-iodophenoxy)zirconium, bis(1,2,3,4-tetramethylcyclopentadienyl)bis(3-iodophenoxy)zirconium, bis(1,2,3,4-tetramethylcyclopentadienyl)bis(4-iodophenoxy)zirconium, bis(1,2,3,4-tetramethylcyclopentadienyl)bis(2-thiomethylphenoxy)zirconium, bis(1,2,3,4-tetramethylcyclopentadienyl)bis(3-thiomethylphenoxy)zirconium, bis(1,2,3,4-tetramethylcyclopentadienyl)bis(4-thiomethylphenoxy)zirconium, bis(pentamethylcyclopentadienyl)bis(2-fluorophenoxy)zirconium, bis(pentamethylcyclopentadienyl)bis(3-fluorophenoxy)zirconium, bis(pentamethylcyclopentadienyl)bis(4-fluorophenoxy)zirconium, bis(ethylcyclopentadienyl)bis(2-ethylphenoxy)zirconium, bis(ethylcyclopentadienyl)bis(3-ethylphenoxy)zirconium, bis(ethylcyclopentadienyl)bis(4-ethylphenoxy)zirconium, bis(isopropylcyclopentadienyl)bis(2-methylphenoxy)zirconium, bis(isopropylcyclopentadienyl)bis(3-methylphenoxy)zirconium, bis(isopropylcyclopentadienyl)bis(4-methylphenoxy)zirconium, bis(n-butylcyclopentadienyl)bis(2-chlorophenoxy)zirconium, bis(n-butylcyclopentadienyl)bis(3-chlorophenoxy)zirconium, bis(n-butylcyclopentadienyl)bis(4-chlorophenoxy)zirconium, bis(n-butylcyclopentadienyl)bis(2-trifluoromethylphenoxy)zirconium, bis(n-butylcyclopentadienyl)bis(3-trifluoromethylphenoxy)zirconium, bis(n-butylcyclopentadienyl)bis(4-trifluoromethylphenoxy)zirconium, bis(n-butylcyclopentadienyl)bis(2-tertiary-butylphenoxy)zirconium, bis(n-butylcyclopentadienyl)bis(3-tertiary-butylphenoxy)zirconium, bis(n-butylcyclopentadienyl)bis(4-tertiary-butylphenoxy)zirconium, bis(n-butylcyclopentadienyl)bis(2-cyanophenoxy)zirconium, bis(n-butylcyclopentadienyl)bis(3-cyanophenoxy)zirconium, bis(n-butylcyclopentadienyl)bis(4-cyanophenoxy)zirconium, bis(tertiary-butylcyclopentadienyl)bis(2-fluorophenoxy)zirconium, bis(tertiary-butylcyclopentadienyl)bis(3-fluorophenoxy)zirconium, bis(tertiary-butylcyclopentadienyl)bis(4-fluorophenoxy)zirconium, bis(tertiary-butylcyclopentadienyl)bis(2-ethylphenoxy)zirconium, bis(tertiary-butylcyclopentadienyl)bis(3-ethylphenoxy)zirconium, bis(tertiary-butylcyclopentadienyl)bis(4-ethylphenoxy)zirconium, bis(tertiary-butylcyclopentadienyl)bis(2,4-dimethylphenoxy)zirconium, bis(1,3-di-tertiary-butylcyclopentadienyl)bis(2-chlorophenoxy)zirconium, bis(1,3-di-tertiary-butylcyclopentadienyl)bis(3-chlorophenoxy)zirconium, bis(1,3-di-tertiary-butylcyclopentadienyl)bis(4-chlorophenoxy)zirconium, bis(1,3-di-tertiary-butylcyclopentadienyl)bis(2-trifluoromethylphenoxy)zirconium, bis(1,3-di-tertiary-butylcyclopentadienyl)bis(3-trifluoromethylphenoxy)zirconium, bis(1,3-di-tertiary-butylcyclopentadienyl)bis(4-trifluoromethylphenoxy)zirconium, bis(phenylcyclopentadienyl)bis(2-phenylphenoxy)zirconium, bis(phenylcyclopentadienyl)bis(3-phenylphenoxy)zirconium, bis(phenylcyclopentadienyl)bis(4-phenylphenoxy)zirconium, bis(phenylcyclopentadienyl)bis(2,4-dichlorophenoxy)zirconium, bis(trimethylsilylcyclopentadienyl)bis(2-tertiary-butoxyphenoxy)zirconium, bis(trimethylsilylcyclopentadienyl)bis(3-tertiary-butoxyphenoxy)zirconium, bis(trimethylsilylcyclopentadienyl)bis(4-tertiary-butoxyphenoxy)zirconium, bis(trimethylsilylcyclopentadienyl)bis(2-phenylphenoxy)zirconium, bis(trimethylsilylcyclopentadienyl)bis(3-phenylphenoxy)zirconium, bis(trimethylsilylcyclopentadienyl)bis(4-phenylphenoxy)zirconium, bis(trimethylsilylcyclopentadienyl)bis(2,4-difluorophenoxy)zirconium, bis(cyclohexylcyclopentadienyl)bis(2-iodophenoxy)zirconium, bis(cyclohexylcyclopentadienyl)bis(3-iodophenoxy)zirconium, bis(cyclohexylcyclopentadienyl)bis(4-iodophenoxy)zirconium, bis(indenyl)bis(2-methylphenoxy)zirconium, bis(indenyl)bis(3-methylphenoxy)zirconium, bis(indenyl)bis(4-methylphenoxy)zirconium, bis(1-methylindenyl)bis(2-fluorophenoxy)zirconium, bis(1-methylindenyl)bis(3-fluorophenoxy)zirconium, bis(1-methylindenyl)bis(4-fluorophenoxy)zirconium, bis(2-methylindenyl)bis(2-bromophenoxy)zirconium, bis(2-methylindenyl)bis(3-bromophenoxy)zirconium, bis(2-methylindenyl)bis(4-bromophenoxy)zirconium, bis(5,6-dimethylindenyl)bis(2-isopropylphenoxy)zirconium, bis(5,6-dimethylindenyl)bis(3-isopropylphenoxy)zirconium, bis(5,6-dimethylindenyl)bis(4-isopropylphenoxy)zirconium, bis(5,6- dimethoxyindenyl)bis(3-cyanophenoxy)zirconium, bis(5,6-dimethoxyindenyl)bis(4-cyanophenoxy)zirconium, bis(fluorenyl)bis(2-chlorophenoxy)zirconium, bis(fluorenyl)bis(3-chlorophenoxy)zirconium, bis(fluorenyl)bis(4-chlorophenoxy)zirconium, bis(4,5,6,7-tetrahydroindenyl)bis(2-tertiary-butylphenoxy)zirconium, bis(4,5,6,7-tetrahydroindenyl)bis(3-tertiary-butylphenoxy)zirconium, bis(4,5,6,7-tetrahydroindenyl)bis(4-tertiary-butylphenoxy)zirconium, bis(2-methyltetrahydroindenyl)bis(2-nitrophenoxy)zirconium, bis(2-methyltetrahydroindenyl)bis(3-nitrophenoxy)zirconium, bis(2-methyltetrahydroindenyl)bis(4-nitrophenoxy)zirconium, bis(2,7-di-tertiary-butylfluorenyl)bis(2-trifluoromethylphenoxy)zirconium, bis(2,7-di-tertiary-butylfluorenyl)bis(3-trifluoromethylphenoxy)zirconium, bis(2,7-di-tertiary-butylfluorenyl)bis(4-trifluoromethylphenoxy)zirconium, and the like.

Further, examples of the compound of the formula (1) of the present invention include metallocene compounds having a zirconium atom of M in the formula (1) substituted with a titanium atom or a hafnium atom, in addition to the above various metallocene compounds.

On the other hands, examples of compounds having various aryloxy groups or substituted aryloxy groups as defined in the formula (2) are illustrated below. Namely, ethylenebis(indenyl)bis(4-trifluoromethylphenoxy)zirconium, ethylenebis(indenyl)bis(4-fluorophenoxy)zirconium, ethylenebis(indenyl)bis(4-chlorophenoxy)zirconium, ethylenebis(indenyl)bis(2-fluorophenoxy)zirconium, ethylenebis(3-methylindenyl)bis(4-trifluoromethylphenoxy)zirconium, ethylenebis(3-methylindenyl)bis(4-fluorophenoxy)zirconium, ethylenebis(3-methylindenyl)bis(4-chlorophenoxy)zirconium, ethylenebis(3-methylindenyl)bis(2-fluorophenoxy)zirconium, ethylenebis(5,6-dimethylindenyl)bis(4-trifluoromethylphenoxy)zirconium, ethylenebis(5,6-dimethylindenyl)bis(4-fluorophenoxy)zirconium, ethylenebis(5,6-dimethylindenyl)bis(4-chlorophenoxy)zirconium, ethylenebis(5,6-dimethylindenyl)bis(2-fluorophenoxy)zirconium, ethylenebis(4,7-dimethylindenyl)bis(4-trifluoromethylphenoxy)zirconium, ethylenebis(4,7-dimethylindenyl)bis(4-fluorophenoxy)zirconium, ethylenebis(5,6-dimethoxyindenyl)bis(4-trifluoromethylphenoxy)zirconium, ethylenebis(5,6-dimethoxyindenyl)bis(4-fluorophenoxy)zirconium, ethylenebis(5,6-dihydroindenyl)bis(4-trifluoromethylphenoxy)zirconium, ethylenebis(5,6-dihydroindenyl)bis(4-fluorophenoxy)zirconium, ethylenebis(5,6-dihydroindenyl)bis(4-chlorophenoxy)zirconium, ethylenebis(5,6-dihydroindenyl)bis(2-fluorophenoxy)zirconium, ethylenebis(4,5,6,7-tetrahydroindenyl)bis(4-trifluoromethylphenoxy)zirconium, ethylenebis(4,5,6,7-tetrahydroindenyl)bis(4-fluorophenoxy)zirconium, ethylenebis(4,5,6,7-tetrahydroindenyl)bis(4-chlorophenoxy)zirconium, ethylenebis(4,5,6,7-tetrahydroindenyl)bis(2-fluorophenoxy)zirconium, methylenebis(cyclopentadienyl)bis(2-fluorophenoxy)zirconium, methylenebis(cyclopentadienyl)bis(2-ethylphenoxy)zirconium, methylenebis(methylcyclopentadienyl)bis(3-chlorophenoxy)zirconium, methylenebis(1,3-dimethylcyclopentadienyl)bis(2-trifluoromethylphenoxy)zirconium, methylenebis(n-butylcyclopentadienyl)bis(4-tertiary-butylphenoxy)zirconium, ethylenebis(3-methylcyclopentadienyl)bis(4-trifluoromethylphenoxy)zirconium, ethylenebis(3-methylcyclopentadienyl)bis(4-fluorophenoxy)zirconium, ethylenebis(3-isopropylcyclopentadienyl)bis(4-trifluoromethylphenoxy)zirconium, ethylenebis(3-isopropylcyclopentadienyl)bis(4-fluorophenoxy)zirconium, ethylenebis(3-tertiary-butylcyclopentadienyl)bis(4-trifluoromethylphenoxy)zirconium, ethylenebis(3-tertiary-butylcyclopentadienyl)bis(4-fluorophenoxy)zirconium, isopropylidene(cyclopentadienyl)(indenyl)bis(4-trifluoromethylphenoxy)zirconium, isopropylidene(cyclopentadienyl)(indenyl)bis(4-fluorophenoxy)zirconium, isopropylidene(methylcyclopentadienyl)(indenyl)bis(4-trifluoromethylphenoxy)zirconium, isopropylidene(methylcyclopentadienyl)(indenyl)bis(4-fluorophenoxy)zirconium, isopropylidenebis(indenyl)bis(4-trifluoromethylphenoxy)zirconium, isopropylidenebis(indenyl)bis(4-fluorophenoxy)zirconium, isopropylidene(cyclopentadienyl)(fluorenyl)bis(4-trifluoromethylphenoxy)zirconium, isopropylidene(cyclopentadienyl)(fluorenyl)bis(4-fluorophenoxy)zirconium, isopropylidene(3-methylcyclopentadienyl)(fluorenyl)bis(4-trifluoromethylphenoxy)zirconium, isopropylidene(3-methylcyclopentadienyl)(fluorenyl)bis(4-fluorophenoxy)zirconium, tetramethylethylidenebis(2-tertiary-butylcyclopentadienyl)bis(4-trifluoromethylphenoxy)zirconium, tetramethylethylidenebis(2-tertiary-butylcyclopentadienyl)bis(4-fluorophenoxy)zirconium, dimethylsilylenebis(indenyl)bis(4-trifluoromethylphenoxy)zirconium, dimethylsilylenebis(indenyl)bis(4-fluorophenoxy)zirconium, dimethylsilylenebis(2-methylindenyl)bis(4-trifluoromethylphenoxy)zirconium, dimethylsilylenebis(2-methylindenyl)bis(4-fluorophenoxy)zirconium, dimethylsilylenebis(2-ethylindenyl)bis(4-trifluoromethylphenoxy)zirconium, dimethylsilylenebis(2-ethylindenyl)bis(4-fluorophenoxy)zirconium, dimethylsilylenebis(2-methyl-5-isopropylindenyl)bis(4-trifluoromethylphenoxy)zirconium, dimethylsilylenebis(2-methyl-5-isopropylindenyl)bis(4-fluorophenoxy)zirconium, dimethylsilylenebis(4,5,6,7-tetrahydroindenyl)bis(4-trifluoromethylphenoxy)zirconium, dimethylsilylenebis(4,5,6,7-tetrahydroindenyl)bis(4-fluorophenoxy)zirconium, dimethylsilylenebis(2-tertiary-butylcyclopentadienyl)bis(4-trifluoromethylphenoxy)zirconium, dimethylsilylenebis(2-tertiary-butylcyclopentadienyl)bis(4-fluorophenoxy)zirconium, dimethylsilylenebis(2-tertiary-butyl-4-methylcyclopentadienyl)bis(4-fluorophenoxy)zirconium, dimethylsilylenebis(2-isopropyl-4-methylcyclopentadienyl)bis(4-fluorophenoxy)zirconium, dimethylsilylene(2,3,5-trimethylcyclopentadienyl)(2,4,5-trimethylcyclopentadienyl)bis(4-fluorophenoxy)zirconium, dimethylsilylene(2,4-dimethylcyclopentadienyl)(3,5-dimethylcyclopentadienyl)bis(4-fluorophenoxy)zirconium, dimethylsilylene(3-tertiary-butylcyclopentadienyl)(4-tertiary-butylcyclopentadienyl)bis(4-fluorophenoxy)zirconium, dimethylsilylene(3-methylcyclopentadienyl)(4-methylcyclopentadienyl)bis(4-fluorophenoxy)zirconium, dimethylsilylene(2,4-dimethylcyclopentadienyl)(3-methylcyclopentadienyl)bis(4-fluorophenoxy)zirconium, dimethylsilylene(2,4-dimethylcyclopentadienyl)(4-methylcyclopentadienyl)bis(4-fluorophenoxy)zirconium, dimethylsilylene(3,4-dimethylcyclopentadienyl)(3-methylcyclopentadienyl)bis(4-fluorophenoxy)zirconium, dimethylsilylene(3-tertiary-butylcyclopentadienyl)(3-methylcyclopentadienyl)bis(4-fluorophenoxy)zirconium, dimethylsilylene(3-tertiary-butylcyclopentadienyl)(4-methylcyclopentadienyl)bis(4-fluorophenoxy)zirconium, dimethylsilylene(2,3,5-trimethylcyclopentadienyl)(cyclopentadienyl)bis(4-fluorophenoxy)zirconium, dimethylsilylene(2,4-dimethylcyclopentadienyl)(cyclopentadienyl)bis(4-fluorophenoxy)zirconium, dimethylsilylene(3-tertiary-butylcyclopentadienyl)(cyclopentadienyl)bis(4-fluorophenoxy)zirconium, dimethylsilylene(3-methylcyclopentadienyl)(cyclopentadienyl)bis(4- fluorophenoxy)zirconium, dimethylsilylene(cyclopentadienyl)(indenyl)bis(4-trifluoromethylphenoxy)zirconium, dimethylsilylene(cyclopentadienyl)(indenyl)bis(4-fluorophenoxy)zirconium, diphenylsilylenebis(indenyl)bis(4-trifluoromethylphenoxy)zirconium, diphenylsilylenebis(indenyl)bis(4-fluorophenoxy)zirconium, dibenzylsilylene(indenyl)bis(4-trifluoromethylphenoxy)zirconium, dibenzylsilylenebis(indenyl)bis(4-fluorophenoxy)zirconium, methylphenylsilylenebis(2-methylindenyl)bis(4-trifluoromethylphenoxy)zirconium, methylphenylsilylenebis(2-methylindenyl)bis(2-fluorophenoxy)zirconium, dimethylsilylenebis(3,4-dimethylcyclopentadienyl)bis(4-trifluoromethylphenoxy)zirconium, dimethylsilylenebis(3,4-dimethylcyclopentadienyl)bis(4-fluorophenoxy)zirconium, dimethylsilylenebis(4,5,6,7-tetrahydroindenyl)bis(4-trifluoromethylphenoxy)zirconium, dimethylsilylenebis(4,5,6,7-tetrahydroindenyl)bis(4-fluorophenoxy)zirconium, and the like.

Also, in addition to the above illustrated various metallocene compounds, metallocene compounds having a zirconium atom of M in the formula (2) replaced by a titanium atom or a hafnium atom may be included.

Examples of an organoaluminum compound (D) used as a component in the present invention include trimethylaluminum, triethylaluminum, triisobutylaluminum, trihexylaluminum, trioctylaluminum and the like. Among them, trimethylaluminum is preferable.

The olefin polymerization solid catalyst of the present invention, which is a catalyst having a reaction product of (C) a transition metal compound and (D) an organoaluminum compound supported on a support comprising (A) silica treated with (B) an organoaluminum-oxy compound, can be produced by various methods.

For example, first, (A) silica is treated with (B) an organoaluminum-oxy compound. This treatment is carried out by contacting (B) an organoaluminum-oxy compound with (A) silica in a solvent or in the absence of a solvent, preferably at −100° C. to 150° C. The solvent is not specially limited as long as it is an inert solvent, preferable examples of which include an aromatic hydrocarbon such as benzene, toluene, xylene or chlorobenzene, or an aliphatic hydrocarbon such as hexane, heptane, cyclohexane or methylcyclohexane.

On the other hand, a reaction product of (C) a transition metal compound with (D) an organoaluminum compound, which is a component to be supported on a support, is produced by contacting 1 to 100 time mols, preferably 1 to 20 time mols of (D) an organoaluminum compound to (C) a transition metal compound, preferably at −100° C. to 50° C. in a solvent or in the absence of a solvent. When using a solvent, such an aromatic hydrocarbon or an aliphatic hydrocarbon as illustrated above is preferably used.

Also, the reaction product of (C) a transition metal compound and (D) an organoaluminum compound is supported on the support comprising (A) silica treated with (B) an organoaluminum-oxy compound by contacting the reaction product of (C) a transition metal compound and (D) an organoaluminum compound with (A) silica support treated with (B) an organoaluminum-oxy compound, in a solvent or in the absence of a solvent, preferably at −100° C. to 100° C. When using a solvent, such an aromatic hydrocarbon or an aliphatic hydrocarbon as illustrated above is preferably used.

The above-mentioned method for producing the olefin polymerization solid catalyst of the present invention is preferable, but the following other method is also usable. That is, it is possible to employ a method of contacting the three components of (A) silica, (B) an organoaluminum-oxy compound and a reaction product of (C) a transition metal compound and (D) an organoaluminum compound at the same time. Also, it is possible to contact (B) an organoaluminum-oxy compound after contacting (A) silica with a reaction product of (C) a transition metal compound and (D) an organoaluminum compound, and further it is possible to employ a method of contacting (A) silica after contacting (B) an organoaluminum-oxy compound with a reaction product of (C) a transition metal compound and (D) an organoaluminum compound. In any case, the contacting method is carried out in a solvent or in the absence of a solvent, preferably at −100° C. to 150° C., and the same solvents as illustrated above are usable.

When treating silica (A) with an organoaluminum-oxy compound (B), an organoaluminum-oxy compound (B) is used in an amount of preferably from 1 to 100 mmols, more preferably from 5 to 50 mmols, in terms of Al atom to 1 g of silica (A). also, a transition metal compound of component (C) is used in an amount of preferably from 0.01 to 5 mmols, more preferably from 0.05 to 1 mmol, to 1 g of silica (A).

The olefin polymerization catalyst of the present invention can be treated by prepolymerization by polymerizing a relatively small amount of olefin previously before polymerization of olefin. The prepolymerization is preferably carried out in the presence of an organoaluminum compound (E), if necessary. The organoaluminum compound (E) is not specially limited, examples of which include a trialkylaluminum or an organoaluminum-oxy compound. Particular examples of the trialkylaluminum include trimethylaluminum, triethylaluminum, triisobutylaluminum, trihexylaluminum, trioctylaluminum and the like. Also, examples of the organoaluminum-oxy compound include methylaluminoxane, ethylaluminoxane, isobutylaluminoxane and the like. They may have a linear or cyclic structure having a polymerization degree of from 2 to 40. Further, these compounds illustrated as the organoaluminum compound (E) are usable in a mixture. The prepolymerization is carried out until olefin is polymerized to form an olefin polymer in an amount of from 0.05 to 500 g, preferably from 0.1 to 100 g, per 1 g of the supported catalyst.

Also, the olefin polymerization catalyst of the present invention may be used alone in the olefin polymerization, but is preferably used together with an organoaluminum compound (G) as a cocatalyst. The organoaluminum compound (G) used for polymerization is not specially limited, but it is possible to use the same compounds as an organoaluminum compound (E). When the olefin polymerization catalyst is used together with a cocatalyst, it may be prepared by adding into an inert hydrocarbon solvent or an olefin medium used for polymerization. The olefin polymerization solid catalyst and the cocatalyst may be mixed and contacted with each other for a predetermined time before polymerization, and each component may be added individually to the polymerization reaction system. The addition order of respective components may be optionally selected.

The olefin polymerization solid catalyst of the present invention is used preferably for homopolymerization of ethylene or propylene, or copolymerization of ethylene or propylene with at most 10 mol % of a $C_3$-$C_{20}$ α-olefin, linear diolefin, cyclic olefin, cyclic polyene, aromatic vinyl compound or the like.

Examples of the α-olefin include propylene, 1-butene, 3-methyl-1-butene, 1-pentene, 1-hexene, 4-methyl-1-pentene, 3-methyl-1-pentene, 1-octene, 1-decene, 1-dodecene, 1-tetradecene, 1-hexadecene, 1-octadecene, 1-tetradecene, 1-hexadecene, 1-octadecene, 1-icosene and the like.

Examples of the linear diolefin include a $C_4$-$C_{20}$ linear diolefin such as non-conjugated dienes of 1,4-pentadiene, 1,4-hexadiene, 1,5-hexadiene, 4-methyl-1,4-hexadiene, 5-methyl-1,4-hexadiene, 5-methyl-1,5-heptadiene, 1,7-octadiene, 7-methyl-1,6-octadiene, 1,9-decadiene or the like, or conjugated dienes of butadiene, isoprene, chloroprene, 1,3-pentadiene, 1,3-hexadiene or the like.

Examples of the cyclic olefin include a $C_4$-$C_{40}$ cyclic olefin, such as cyclobutene, cyclopentene, cyclohexene, cycloheptene, cyclooctene, 2-norbornene, 5-methyl-2-norbornene, 5-ethyl-2-norbornene, 5-chloro-2-norbornene, 5-methoxy-2-norbornene, 5,6-dicarboxylnorbornene anhydride, tetracyclododecene, 5-phenylnorbornene or the like.

Further, examples of the cyclic polyene include a $C_5$-$C_{40}$ cyclic polyene, such as dicyclopentadiene, cyclopentadiene, norbornadiene, 5-vinyl-2-norbornene, 5-ethylidene-2-norbornene, cyclooctatriene or the like. Further, examples of the aromatic vinyl compound include styrene, α-methylstyrene, divinylbenzene or the like.

The polymerization of the present invention is carried out by any polymerization method such as slurry polymerization, solution polymerization, gas phase polymerization or the like. However, slurry polymerization and gas phase polymerization are particularly preferable since a polyolefin having excellent powder properties is obtainable.

In the present invention, when carrying out solution polymerization or slurry polymerization, an inert hydrocarbon solvent or an olefin itself supplied for polymerization is usable as a solvent. Examples of the inert hydrocarbon solvent include an aliphatic hydrocarbon such as butane, isobutane, pentane, hexane or octane; an alicyclic hydrocarbon such as cyclopentane, methylcyclopentane or cyclohexane; an aromatic hydrocarbon such as benzene, toluene or xylene; and a petroleum distillate such as naphtha, kerosine or gas oil.

A polymerization temperature for carrying out the polymerization of the present invention is usually from −20° C. to 100° C., preferably from 20° C. to 90° C. in case of slurry polymerization, and usually from 0° C. to 120° C., preferably from 20° C. to 100° C. in case of gas phase polymerization. When solution polymerization is carried out, its polymerization temperature is usually from 0° C. to 300° C., preferably from 100° C. too 250° C. A polymerization pressure is usually from atmospheric pressure to 10 MPa, preferably from atmospheric pressure to 5 MPa, and the polymerization reaction can be carried out by any method of batch-wise system, semi-continuous system or continuous system. Further, it is possible to carry out the polymerization at two or more stages respectively having different reaction conditions. A molecular weight of an olefin polymer obtained can be adjusted by addition of hydrogen in the polymerization system or varying a polymerization temperature.

EXAMPLES

Hereinafter, the present invention is further illustrated with reference to Examples, but should not be limited to these Examples.

Physical properties in the following Examples were measured in accordance with the following methods.

1. Specific Surface Area of Support:

Specific surface area was calculated by BET method using BELSORP28SA manufactured by Bel Japan Inc.

2. Pore Volume of Support:

Pore volume was calculated by DH method using BELSORP28SA manufactured by Bel Japan Inc.

3. Average Particle Size of Support:

Average particle size was calculated by laser diffraction method using LA-910 manufactured by HORIBA, LTD.

4. Trimethylaluminum (TMAL) Content in Methylaluminoxane:

Trimethylaluminum content was calculated on the basis of $^1$H-NMR spectrum measured at room temperature in a mixture solvent of deuterated dioxane-deuterated benzene by using AM-400 manufactured by BRUKER.

5. Amounts of Aluminum Atom, Zirconium Atom and Hafnium Atom Carried on Solid Catalyst:

These values were calculated by ICP analysis using SPS-1500VR manufactured by Seiko Instruments Inc.

6. Determination of Comonomer Content in Polymer:

Comonomer content was calculated on the basis of $^{13}$C-NMR spectrum measured at 125° C. in a mixture solvent of ortho-dichlorobenzene-deuterated benzene by using AM-400 manufactured by BRUKER.

7. Molecular Weight and Molecular Weight Distribution of Polymer:

Weight average molecular weight (Mn) and number average molecular weight (Mn) were calculated by measuring at 135° C. by using gel permeation chromatography (150C manufactured by Waters) and 1,2,4-trichlorobenzene as a solvent, and a molecular weight distribution of Mw/Mn was determined on the basis of the above measured values.

8. Bulk Density of Polymer:

Polymer bulk density was measured in accordance with JIS K6721-1966 (measured at ½ scale when an amount of polymer is small).

9. Particle Size Distribution of Polymer:

Particle size distribution was determined by classifying 2 g of polymer by using 8 kinds of sieves from 32 to 260 meshes by ultrasonic type particle size distribution-measuring machine RPS-85 (manufactured by SEISHIN ENTERPRISE Co., Ltd.), and an average particle size was determined by 50% particle size.

Example 1

(Preparation of Solid Catalyst)

100 ml of toluene and 5 g of silica ("CARiACT, G-3" tradename of Fuji Silysia Chemical Ltd.; specific surface area 779 m$^2$/g, pore volume 0.23 ml/g, average particle size 6.7 μm) dried at 200° C. for 4 hours in a nitrogen stream were charged into a glass-made flask of 300 ml dried and replaced by nitrogen, and an organoaluminum-oxy compound (methylaluminoxane manufactured by ALBEMARLE; TMAL content 14.5%, concentration in terms of Al atom 2.9 mol/l, 17.2 ml, 50 mmol) was added thereto at room temperature over 30 minutes with stirring to treat them at room temperature for 30 minutes and at 80° C. for 1 hour. The suspension was cooled to room temperature to obtain a solid component which was then fully washed with toluene and was then re-suspended in 100 ml of toluene.

On the other hand, 0.36 g (0.6 mmol) of bis(1,3-dimethylcyclopentadienyl)bis(2-trifluoromethylphenoxy)zirconium and 50 ml of toluene were charged into a glass-made flask of 100 ml dried and replaced by nitrogen, and the former material was completely dissolved. Thereafter, a toluene solution of trimethylaluminum (2.0 mol/l, 3.0 ml, 6.0 mmol) was added thereto, and the reactants were stirred at room temperature for 1 hour to obtain a purple color catalyst solution as a reaction product.

The catalyst solution thus obtained was added to the above prepared suspension of silica treated with methylaluminoxane, and the resultant mixture was reacted at room temperature for 1 hour. A solid component obtained was fully washed with toluene, and then fully washed with hexane to obtain a hexane suspension of a solid catalyst having 11.5 mmol of aluminum atom and 0.11 mmol of zirconium atom supported per 1 g of silica.

(Polymerization)

800 ml of n-hexane was charged into a stainless steel-made autoclave of 1.6 liter having the inside dried and replaced by ethylene, and heated to 50° C. Thereafter, 0.5 mmol of triethylaluminum and 13.8 mg of the above obtained solid catalyst were added in order. After heating to 75° C., ethylene was continuously introduced to carry out polymerization under a polymerization pressure of 0.8 MPa for 1 hour.

After finishing the polymerization, a polymer was separated from the solvent and was dried to obtain 85.7 g of white powdery polyethylene having a bulk density of 320 kg/m$^3$ and containing 1.0 wt % of fine particles having a particle size of at most 63 μm and 0.1 wt % of large particles having a particle size of at least 500 μm. No deposition nor adhesion of the polyethylene was observed in the inside of the autoclave. Thus, the polyethylene obtained by this Example had a high bulk density, a narrow particle size distribution and satisfactory powder properties. Also, the catalyst of this Example had a polymerization activity of 6.21 kg-PE/g-cat., and the polyethylene thus obtained had a weight average molecular weight (Mw) of 437,000, and a ratio (Mw/Mn) of weight average weight/number average molecular weight was 2.3 and a molecular weight distribution was narrow.

Example 2

(Polymerization)

Copolymerization of ethylene and 1-hexene was carried out by using the solid catalyst obtained in Example 1. The polymerization was carried out in the same manner as in Example 1, except that 12.9 mg of the solid catalyst obtained in Example 1 was used, and n-hexane was charged and then 20 ml of 1-hexene was charged at the time of operating the polymerization. As this result, 82.8 g of powdery polyethylene having a bulk density of 331 kg/m$^3$ and containing 0.5 wt % of fine particles having a particle size of at most 63 μm and 0.2 wt % of large particles having a particle size of at least 500 μm was obtained. The catalyst of this Example had a polymerization activity of 6.42 kg-PE/g-cat., and the polyethylene thus obtained had a weight average molecular weight (Mw) of 371,000, and a ratio (Mw/Mn) of weight average molecular weight/number average molecular weight was 2.4 and 1-hexene content in the copolymer thus obtained was 0.7 mol %. No deposition nor adhesion of the polyethylene was observed in the inside of the autoclave.

Example 3

(Preparation of Solid Catalyst)

A catalyst was prepared in the same manner as in the solid catalyst preparation of Example 1, except that 0.6 mmol of bis(n-butylcyclopentadienyl)bis(2-trifluoromethylphenoxy)zirconium was used in place of bis(1,3-dimethylcyclopentadienyl)bis(2-trifluoromethylphenoxy)zirconium, and a solid catalyst having 11.8 mmol of aluminum atom and 0.11 mmol of zirconium atom supported per 1 g of silica was obtained.

(Polymerization)

Polymerization was carried out in the same manner as in Example 1, except that 6.1 mg of the above obtained solid catalyst was used, and 114.7 g of powdery polyethylene having a bulk density of 335 kg/m$^3$ and containing 1.1 wt % of fine particles having a particle size of at most 63 μm and 0.1 wt % of large particles having a particle size of at least 500 μm was obtained. The catalyst of this Example had a polymerization activity of 18.80 kg-PE/g-cat., and the polyethylene thus obtained had a weight average molecular weight (Mw) of 227,000, and a ratio (Mw/Mn) of weight average molecular weight/number average molecular weight was 2.3 and a molecular weight distribution was narrow. No deposition nor adhesion of the polyethylene was observed in the inside of the autoclave.

Example 4

(Preparation of Solid Catalyst)

A catalyst was prepared in the same manner as in the solid catalyst preparation of Example 1, except that 0.6 mmol of bis(1,3-dimethylcyclopentadienyl)bis(3-trifluoromethylphenoxy)zirconium was used in place of bis(1,3-dimethylcyclopentadienyl)bis(2-trifluoromethylphenoxy)zirconium, and a solid catalyst having 11.3 mmol of aluminum atom and 0.11 mmol of zirconium atom supported per 1 g of silica was obtained.

(Polymerization)

Polymerization was carried out in the same manner as in Example 1, except that 15.9 mg of the above obtained solid catalyst was used, and 95.4 g of powdery polyethylene having a bulk density of 327 kg/m$^3$ was obtained. The catalyst of this Example had a polymerization activity of 6.00 kg-PE/g-cat., and the polyethylene thus obtained had a weight average molecular weight (Mw) of 424,000, and a ratio (Mw/Mn) of weight average molecular weight/number average molecular weight was 2.3 and a molecular weight distribution was narrow. No deposition nor adhesion of the polyethylene was observed in the inside of the autoclave.

Example 5

(Preparation of Solid Catalyst)

A catalyst was prepared in the same manner as in the solid catalyst preparation of Example 1, except that 0.6 mmol of bis(1,3-dimethylcyclopentadienyl)bis(2-methyl-4-fluorophenoxy)zirconium was used in place of bis(1,3-dimethylcyclopentadienyl)bis(2-trifluoromethylphenoxy)zirconium, and a solid catalyst having 11.7 mmol of aluminum atom and 0.11 mmol of zirconium atom carried per 1 g of silica was obtained.

(Polymerization)

Polymerization was carried out in the same manner as in Example 1, except that 14.2 mg of the above obtained solid catalyst was used, and 87.0 g of powdery polyethylene having a bulk density of 322 kg/m$^3$ was obtained. The catalyst of this Example had a polymerization activity of 6.13 kg-PE/g-cat., and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 1

(Preparation of Solid Catalyst)

A catalyst was prepared in the same manner as in the solid catalyst preparation of Example 1, except that a toluene solution containing 0.6 mmol of bis(1,3-diemthylcyclopentadienyl)bis(2-trifluoromethylphenoxy)zirconium without reacting with trimethylaluminum was used in place of the reaction solution having bis(1,3-dimethylcyclopentadienyl)bis(2-trifluoromethylphenoxy)zirconium reacted with trimethylaluminum, and a solid catalyst having 10.2 mmol of aluminum atom and 0.10 mmol of zirconium atom supported per 1 g of silica was obtained.

(Polymerization)

Polymerization was carried out in the same manner as in Example 1, except that 20.9 mg of the above obtained solid catalyst was used, and 72.7 g of powdery polyethylene having a bulk density of 331 kg/m$^3$ was obtained. The catalyst of this Example had a polymerization activity of 3.48 kg-PE/g-cat., and the polyethylene thus obtained had a weight average molecular weight (Mw) of 435,000, and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 2

(Preparation of Solid Catalyst)

A catalyst was prepared in the same manner as in the solid catalyst preparation of Example 1, except that 0.6 mmol of bis(1,3-dimethylcyclopentadienyl)zirconium dichloride was used in place of bis(1,3-dimethylcyclopentadienyl)bis(2-trifluoromethylphenoxy)zirconium, and a solid catalyst having 11.4 mmol of aluminum atom and 0.11 mmol of zirconium atom supported per 1 g of silica was obtained.

(Polymerization)

Polymerization was carried out in the same manner as in Example 1, except that 24.6 mg of the above obtained solid catalyst was used, and 87.8 g of powdery polyethylene having a bulk density of 319 kg/m$^3$ was obtained. The catalyst of this Example had a polymerization activity of 3.57 kg-PE/g-cat., and the polyethylene thus obtained had a weight average molecular weight (Mw) of 430,000, and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 3

(Preparation of Solid Catalyst)

A catalyst was prepared in the same manner as in the solid catalyst preparation of Comparative Example 1, except that 0.6 mmol of bis(1,3-dimethylcyclopentadienyl)zirconium dichloride was used in place of bis(1,3-dimethylcyclopentadienyl)bis(2-trifluoromethylphenoxy)zirconium, and a solid catalyst having 10.4 mmol of aluminum atom and 0.10 mmol of zirconium atom carried per 1 g of silica was obtained.

(Polymerization)

Polymerization was carried out in the same manner as in Example 1, except that 24.7 mg of the above obtained solid catalyst was used, and 68.9 g of powdery polyethylene having a bulk density of 310 kg/m$^3$ was obtained. The catalyst of this Example had a polymerization activity of 2.79 kg-PE/g-cat., and the polyethylene thus obtained had a weight average molecular weight (Mw) of 432,000, and a ratio (Mw/Mn) of weight average molecular weight/number average molecular weight was 2.2 and a molecular weight distribution was narrow. No deposition nor adhesion of the polyethylene was observed in the inside of the autoclave.

Comparative Example 4

(Preparation of Solid Catalyst)

A catalyst was prepared in the same manner as in the solid catalyst preparation of Example 1, except that 0.6 mmol of bis(n-butylcyclopentadienyl)zirconium dichloride was used in place of bis(1,3-dimethylcyclopentadienyl)bis(2-trifluoromethylphenoxy)zirconium, and a solid catalyst having 11.3 mmol of aluminum atom and 0.11 mmol of zirconium atom supported per 1 g of silica was obtained.

(Polymerization)

Polymerization was carried out in the same manner as in Example 1, except that 8.5 mg of the above obtained solid catalyst was used, and 108.4 g of powdery polyethylene having a bulk density of 325 kg/m$^3$ was obtained. The catalyst of this Example had a polymerization activity of 12.75 kg-PE/g-cat., and the polyethylene thus obtained had a weight average molecular weight (Mw) of 224,000, and a ratio (Mw/Mn) of weight average molecular weight/number average molecular weight was 2.4 and a molecular weight distribution was narrow. No deposition nor adhesion of the polyethylene was observed in the inside of the autoclave.

Comparative Example 5

(Preparation of Solid Catalyst)

A catalyst was prepared in the same manner as in the solid catalyst preparation of Example 1, except that a toluene solution containing 0.6 mmol of bis(n-butylcyclopentadienyl)bis(2-trifluoromethylphenoxy)zirconium without reacting with trimethylaluminum was used in place of the reaction solution having bis(1,3-dimethylcyclopentadienyl)bis(2-trifluoromethylphenoxy)zirconium reacted with trimethylaluminum, and a solid catalyst having 10.1 mmol of aluminum atom and 0.11 of zirconium atom carried per 1 g of silica was obtained.

(Polymerization)

Polymerization was carried out in the same manner as in Example 1, except that 9.3 mg of the above obtained solid catalyst was used, and 111.7 g of powdery polyethylene having a bulk density of 319 kg/m$^3$ was obtained. The catalyst of this Example had a polymerization activity of 12.01 kg-PE/g-cat., and the polyethylene thus obtained had a weight average molecular weight (Mw) of 227,000, and a ratio (Mw/Mn) of weight average molecular weight/number average molecular weight was 2.3 and a molecular weight distribution was narrow. No deposition nor adhesion of the polyethylene was observed in the inside of the autoclave.

Example 6

(Preparation of Solid Catalyst)

A catalyst was prepared in the same manner as in the solid catalyst preparation of Example 1, except that 0.6 mmol of (1,3-dimethylindenyl)(cyclopentadienyl)bis(2-trifluoromethylphenoxy)zirconium was used in place of bis(1,3-dimethylcyclopentadienyl)bis(2-trifluoromethylphenoxy)zirconium, and a solid catalyst having 11.7 mmol of aluminum atom and 0.11 mmol of zirconium atom supported per 1 g of silica was obtained.

(Polymerization)

Polymerization was carried out in the same manner as in Example 1, except that 9.0 mg of the above obtained solid catalyst was used, and 126.9 g of powdery polyethylene having a bulk density of 314 kg/m$^3$ was obtained. The catalyst of this Example had a polymerization activity of 14.10 kg-PE/g-cat., and the polyethylene thus obtained had a weight average molecular weight (Mw) of 396,000, and a ratio (Mw/Mn) of weight average molecular weight/number average molecular weight was 2.3 and a molecular weight distribution was narrow. No deposition nor adhesion of the polyethylene was observed in the inside of the autoclave.

Example 7

(Preparation of Solid Catalyst)

A catalyst was prepared in the same manner as in the solid catalyst preparation of Example 1, except that 0.6 mmol of bis(n-butylcyclopentadienyl)bis(2-trifluoromethylphenoxy)hafnium was used in place of bis(1,3-dimethylcyclopentadienyl)bis(2-trifluoromethylphenoxy)zirconium, and a solid catalyst having 11.8 mmol of aluminum atom and 0.10 mmol of hafnium atom supported per 1 g of silica was obtained.

(Polymerization)

Polymerization was carried out in the same manner as in Example 1, except that 27.2 mg of the above obtained solid catalyst was used, and 60.1 g of powdery polyethylene having a bulk density of 289 kg/m$^3$ was obtained. The catalyst of this Example had a polymerization activity of 2.21 kg-PE/g-cat. No deposition nor adhesion of the polyethylene was observed in the inside of the autoclave.

Example 8

(Preparation of Solid Catalyst)

A catalyst was prepared in the same manner as in the solid catalyst preparation of Example 1, except that 0.6 mmol of ethylenebis(4,5,6,7-tetrahydro-1-indenyl)bis(2-trifluoromethylphenoxy)zirconium was used in place of bis(1,3-dimethylcyclopentadienyl)bis(2-trifluoromethylphenoxy)zirconium, and a solid catalyst having 11.3 mmol of aluminum atom and 0.10 mmol of zirconium atom supported per 1 g of silica was obtained.

(Polymerization)

Polymerization was carried out in the same manner as in Example 1, except that 12.7 mg of the above obtained solid catalyst was used, and 92.1 g of powdery polyethylene having a bulk density of 309 kg/m$^3$ was obtained. The catalyst of this Example had a polymerization activity of 7.25 kg-PE/g-cat., and the polyethylene thus obtained had a weight average molecular weight (Mw) of 246,000, and a ratio (Mw/Mn) of weight average molecular weight/number average molecular weight was 2.5 and a molecular weight distribution was narrow. No deposition nor adhesion of the polyethylene was observed in the inside of the autoclave.

Example 9

(Preparation of Solid Catalyst)

A catalyst was prepared in the same manner as in the solid catalyst preparation of Example 1, except that 0.6 mmol of bis(1,2,4-trimethylcyclopentadienyl)bis(2-trifluoromethylphenoxy)zirconium was used in place of bis(1,3-dimethylcyclopentadienyl)bis(2-trifluoromethylphenoxy)zirconium, and a solid catalyst having 11.6 mmol of aluminum atom and 0.10 mmol of zirconium atom supported per 1 g of silica was obtained.

(Polymerization)

Copolymerization of ethylene and 1-hexene was carried out by using the above obtained solid catalyst. The polymerization was carried out in the same manner as in Example 1, except that 12.9 mg of the solid catalyst obtained in this Example 9 was used and n-hexane was charged and then 10 ml of 1-hexene was charged at the time of operating the polymerization. As this result, 63.0 g of powdery polyethylene having a bulk density of 316 kg/m$^3$ was obtained. The catalyst of this Example had a polymerization activity of 4.88 kg-PE/g-cat., and the polyethylene thus obtained had a weight average molecular weight (Mw) of 271,000, and a ratio (Mw/Mn) of weight average molecular weight/number average molecular weight was 2.4, and 1-hexene content in the copolymer was 0.5 mol %. No deposition nor adhesion of the polyethylene was observed in the inside of the autoclave.

Example 10

(Preparation of Solid Catalyst)

A catalyst was prepared in the same manner as in the solid catalyst preparation of Example 1, except that 0.6 mmol of bis(n-butylcyclopentadienyl)bis(2-t-butylphenoxy)zirconium was used in place of bis(1,3-dimethylcyclopentadienyl)bis(2-trifluoromethylphenoxy)zirconium, and a solid catalyst having 11.2 mmol of aluminum atom and 0.11 mmol of zirconium atom supported per 1 g of silica was obtained.

(Polymerization)

Copolymerization with 1-hexene was carried out in the same manner as in Example 2, except that 7.5 mg of the above obtained solid catalyst was used, and 114.6 g of powdery polyethylene having a bulk density of 322 kg/m$^3$ was obtained. The catalyst of this Example had a polymerization activity of 15.28 kg-PE/g-cat., and the polyethylene thus obtained had a weight average molecular weight (Mw) of 136,000, and a ratio (Mw/Mn) of weight average molecular weight/number average molecular weight was 2.3 and a molecular weight distribution was narrow. No deposition nor adhesion of the polyethylene was observed in the inside of the autoclave.

Example 11

(Preparation of Solid Catalyst)

Prepolymerization was carried out by using the solid catalyst obtained in Example 1. 800 ml of n-hexane was charged into a stainless steel-made autoclave of 1.6 L dried and replaced by ethylene, and 9.5 g of the solid catalyst obtained in Example 1 was added thereto at room temperature. After heating to 40° C., ethylene was continuously introduced to carry out polymerization under a polymerization pressure of 0.05 MPa for 15 minutes to obtain a hexane suspension of a solid catalyst having 2.5 g of polyethylene prepolymerized by per 1 g of the solid catalyst.

(Polymerization)

Polymerization was carried out in the same manner as in Example 1, except that 41.7 mg of the above obtained solid catalyst was used, and 74.9 g of powdery polyethylene having a bulk density of 334 kg/m$^3$ was obtained. The catalyst of this Example had a polymerization activity of 6.29 kg-PE/g-cat., and the polyethylene thus obtained had a weight average molecular weight (Mw) of 436,000, and a ratio (Mw/Mn) of weight average molecular weight/number average molecular weight was 2.3 and a molecular weight distribution was narrow. No deposition nor adhesion of the polyethylene was observed in the inside of the autoclave.

Example 12

(Preparation of Solid Catalyst)

A catalyst was prepared in the same manner as in the solid catalyst preparation of Example 1, except that silica ("SUN-SPHERE, H-121-C1", manufactured by Asahi Glass Company, Limited; specific surface area 648 m$^2$/g, pore volume 0.51 ml/g, average particle size 10.5 μm) was used, and a solid catalyst having 11.0 mmol of aluminum atom and 0.11 mmol of zirconium atom supported per 1 g of silica was obtained.

(Polymerization)

Polymerization was carried out in the same manner as in Example 1, except that 14.7 mg of the above obtained solid catalyst was used, and 90.4 g of powdery polyethylene having a bulk density of 316 kg/m$^3$ and containing 1.3 wt % of fine particles having a particle size of at most 63 μm and 0.3 wt % of large particles having a particle size of at least 500 μm was obtained. The catalyst of this Example had a polymerization activity of 6.15 kg-PE/g-cat., and the polyethylene thus obtained had a weight average molecular weight (Mw) of 435,000, and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 6

(Preparation of Solid Catalyst)

A catalyst was prepared in the same manner as in the solid catalyst preparation of Example 4, except that a toluene solution containing 0.6 mmol of bis(1,3-dimethylcyclopentadienyl)bis(3-trifluoromethylphenoxy)zirconium without reacting with trimethylaluminum was used in place of the reaction solution having bis(1,3-dimethylcyclopentadienyl)bis(3-trifluoromethylphenoxy)zirconium reacted with trimethylaluminum, and a solid catalyst having 10.1 mmol of aluminum atom and 0.12 mmol of zirconium atom supported per 1 g of silica was obtained.

(Polymerization)

Polymerization was carried out in the same manner as in Example 1, except that 21.0 mg of the above obtained solid catalyst was used, and 68.3 g of powdery polyethylene having a bulk density of 320 kg/m$^3$ was obtained. The catalyst of this Example had a polymerization activity of 3.25 kg-PE/g-cat., and the polyethylene thus obtained had a weight average molecular weight (Mw) of 425,000, and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 7

(Preparation of Solid Catalyst)

A catalyst was prepared in the same manner as in the solid catalyst preparation of Comparative Example 1, except that 0.6 mmol of bis(n-butylcyclopentadienyl)zirconium dichloride was used in place of bis(1,3-dimethylcyclopentadienyl)bis(2-trifluoromethylphenoxy)zirconium, and a solid catalyst having 10.0 mmol of aluminum atom and 0.12 mmol of zirconium atom supported per 1 g of silica was obtained.

(Polymerization)

Polymerization was carried out in the same manner as in Example 1, except that 9.3 mg of the above obtained solid catalyst was used, and 97.0 g of powdery polyethylene having a bulk density of 312 kg/m$^3$ was obtained. The catalyst of this Example had a polymerization activity of 10.43 kg-PE/g-cat., and the polyethylene thus obtained had a weight average molecular weight (Mw) of 230,000, and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 8

(Preparation of Solid Catalyst)

A catalyst was prepared in the same manner as in the solid catalyst preparation of Example 8, except that a toluene solution containing 0.6 mmol of ethylenebis(4,5,6,7-tetrahydro-1-indenyl)bis(2-trifluoromethylphenoxy)zirconium without reacting with trimethylaluminum was used in place of the reaction solution having ethylenebis(4,5,6,7-tetrahydro-1-indenyl)bis(2-trifluoromethylphenoxy)zirconium reacted with trimethylaluminum, and a solid catalyst having 10.2 mmol of aluminum atom and 0.10 mmol of zirconium atom supported per 1 g of silica was obtained.

(Polymerization)

Polymerization was carried out in the same manner as in Example 1, except that 15.8 mg of the above obtained solid catalyst was used, and 69.8 g of powdery polyethylene having a bulk density of 312 kg/m$^3$ was obtained. The catalyst of this Example had a polymerization activity of 4.42 kg-PE/g-cat., and the polyethylene thus obtained had a weight average molecular weight (Mw) of 241,000, and a ratio (Mw/Mn) of weight average molecular weight/number average molecular weight was 2.3 and a molecular weight distribution was narrow. No deposition nor adhesion of the polyethylene was observed in the inside of the autoclave.

Comparative Example 9

(Preparation of Solid Catalyst)

A catalyst was prepared in the same manner as in the solid catalyst preparation of Example 1, except that silica("CARiACT, P-10" of Fuji Silysia Chemical Ltd.; specific surface area 296 m$^2$/g, pore volume 1.44 ml/g, average particle size 28.3 µm) was used, and a solid catalyst having 11.1 mmol of aluminum atom and 0.11 mmol of zirconium atom supported per 1 g of silica was obtained.

(Polymerization)

Polymerization was carried out in the same manner as in Example 1, except that 25.7 mg of the above obtained solid catalyst was used, and 20.3 g of powdery polyethylene having a bulk density of 190 kg/m$^3$ and containing 0.9 wt % of fine particles having a particle size of at most 63 µm and 23.5 wt % of large particles having a particle size of 500 µm was obtained. The catalyst of this Example had a polymerization activity of 0.79 kg-PE/g-cat., and the polyethylene thus obtained had a weight average molecular weight (Mw) of 379,000, and a ratio (Mw/Mn) of weight average molecular weight/number average molecular weight was 2.3 and a molecular weight distribution was narrow. No deposition nor adhesion of the polyethylene was observed in the inside of the autoclave.

The entire disclosure of Japanese Patent Application No. 2003-402182 filed on Dec. 1, 2003 including specification, claims and summary is incorporated herein by reference in its entirety.

What is claimed is:

1. An olefin polymerization solid catalyst comprising a reaction product of (C) a transition metal compound of the following formula (1) or (2) and (D) a trialkylaluminum compound supported on a support having (A) silica treated with (B) an organoaluminum-oxy compound;

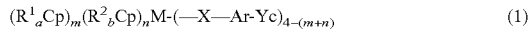

$$(R^1{}_aCp)_m(R^2{}_bCp)_nM\text{-}(\text{---}X\text{---}Ar\text{-}Yc)_{4-(m+n)} \quad (1)$$

wherein M is titanium, zirconium or hafnium, Cp is a group having a cyclopentadienyl structure, $R^1$ and $R^2$ are each a hydrogen atom, an alkyl group, an alkenyl group, an aryl group, an alkylaryl group, an arylalkyl group or an alkylsilyl group, X is an oxygen atom or a sulfur atom, Ar is an aromatic ring, Y may be the same or different and is a hydrogen atom or a substituent selected from the group consisting of a hydrocarbon group, an alkylsilyl group, a halogen atom, a halogenated hydrocarbon group, a nitrogen-containing organic group, an oxygen-containing organic group or a sulfur-containing organic group, a and b are each an integer of from 0 to 5, m and n are each an integer of from 0 to 3, m+n is an integer of from 1 to 3, and c is an integer of from 1 to 5, provided that Y is not hydrogen when Ar is a benzene ring,

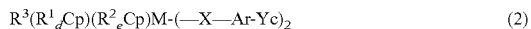

$$R^3(R^1{}_dCp)(R^2{}_eCp)M\text{-}(\text{---}X\text{---}Ar\text{-}Yc)_2 \quad (2)$$

wherein M is titanium, zirconium or hafnium, Cp is a group having a cyclopentadienyl structure, $R^1$ and $R^2$ are each a hydrogen atom, an alkyl group, an alkenyl group, an aryl group, an alkylaryl group, an arylalkyl group or an alkylsilyl group, $R^3$ is a divalent group selected from the group consisting of an alkylene group, an arylalkylene group, a dialkylsilylene group, a dialkylgermylene group, an alkylphosphinediyl group or an alkylimino group, which crosslinks ($R^1$dCp) and ($R^2$eCp), X is an oxygen atom or a sulfur atom, Ar is an aromatic ring, Y may be the same or different and is a hydrogen atom or a substituent selected from the group consisting of a hydrocarbon group, an alkylsilyl group, a halogen atom, a halogenated hydrocarbon group, a nitrogen-containing organic group, an oxygen-containing organic group and a sulfur-containing organic group, d and e are each an integer of from 0 to 4, and c is an integer of from 1 to 5, provided that Y is not hydrogen when Ar is a benzene ring, wherein the catalyst is prepared, in a solvent or in the absence of a solvent, by contacting the reaction product of (C) and (D), with (A) treated with (B).

2. The olefin polymerization solid catalyst according to claim 1, wherein X is an oxygen atom and Ar is a benzene ring or a naphthalene ring in the compound of the formula (1) or (2).

3. The olefin polymerization solid catalyst according to claim 1, wherein Y is a hydrogen atom or a substituent selected from the group consisting of a $C_1$-$C_{10}$ alkyl group, a $C_6$-$C_{10}$ aryl group, a $C_2$-$C_{10}$ alkenyl group, a $C_2$-$C_{10}$ alkynyl group, a $C_7$-$C_{20}$ arylalkyl group, a $C_8$-$C_{20}$ arylalkenyl group, a $C_7$-$C_{20}$ alkylaryl group, an alkylsilyl group, a halogen atom, a halogenated hydrocarbon group, a cyano group, a nitro group, an alkoxy group, an aryloxy group, a thioalkyl group and a thioaryl group.

4. The olefin polymerization solid catalyst according to claim 1, wherein (A) the silica support has (i) a specific surface area of from 350 to 850 m$^2$/g, (ii) a pore volume of from 0.1 to 0.8 ml/g, and (iii) an average particle size of from 2 to 20 µm.

5. The olefin polymerization solid catalyst according to claim 1, wherein (B) the organoaluminum-oxy compound is an alkylaluminoxane of the formula (3) or (4);

wherein $R^4$ is a hydrogen atom or a $C_1$-$C_{10}$ alkyl group, and f is an integer of from 2 to 40.

6. An olefin polymerization solid catalyst formed with an olefin polymer produced by prepolymerization with a solid catalyst as defined in claim 1 in the presence of (E) an organoaluminum compound.

7. The olefin polymerization solid catalyst according to claim 1, wherein the olefin is ethylene.

8. An olefinic polymer production method comprising polymerizing or copolymerizing an olefin in the presence of an olefin polymerization solid catalyst as defined in claim 1.

* * * * *